United States Patent
Young (10) Patent No.: US 9,510,039 B2
(45) Date of Patent: Nov. 29, 2016

(54) SYSTEM AND METHOD FOR DISPLAYING SECONDARY CONTENT ON A DISPLAY DEVICE

(71) Applicant: Sony Corporation, Tokyo (JP)

(72) Inventor: David Young, San Diego, CA (US)

(73) Assignee: Sony Corporation, Tokyo (JP)

( * ) Notice: Subject to any disclaimer, the term of this patent is extended or adjusted under 35 U.S.C. 154(b) by 150 days.

(21) Appl. No.: 13/784,614

(22) Filed: Mar. 4, 2013

(65) Prior Publication Data
US 2014/0247266 A1    Sep. 4, 2014

(51) Int. Cl.
*G06T 11/60* (2006.01)
*H04N 21/431* (2011.01)

(52) U.S. Cl.
CPC .......... *H04N 21/4314* (2013.01); *G06T 11/60* (2013.01); *H04N 21/4316* (2013.01)

(58) Field of Classification Search
USPC ............... 353/30; 715/798; 348/552; 725/41
See application file for complete search history.

(56) References Cited

U.S. PATENT DOCUMENTS

| | | | |
|---|---|---|---|
| 8,381,246 B2* | 2/2013 | Skog et al. ........ | 725/41 |
| 2004/0237114 A1* | 11/2004 | Drazin ........... | 725/105 |
| 2011/0242492 A1* | 10/2011 | Jung et al. ........ | 353/30 |
| 2011/0270948 A1* | 11/2011 | Zmuda ........... | 709/217 |
| 2011/0289530 A1* | 11/2011 | Dureau ........... | H04N 21/4622 725/38 |
| 2011/0310297 A1* | 12/2011 | Gawel et al. ....... | 348/552 |
| 2013/0227398 A1* | 8/2013 | Bolstad ........... | G06F 17/212 715/236 |
| 2013/0311940 A1* | 11/2013 | Ragusa ........... | 715/798 |

OTHER PUBLICATIONS

Studio FRST Multiple Aspect Ratio TV Concept; http://www.gizmag.com.concept-multi-aspect-ration-ty/12446/; 4 pages; downloaded Feb. 4, 2014.
Epinions; Polaroid FLM-1511 15" 720p HD LCD Television Consumer Reviews; Polaroid's Square HDTV; http://www.epinions.com/review/Polaroid_15_HDTV_Monitor_FLM_1511/content_328281394820?sb=1; 3 pages; downloaded Feb. 4, 2014.
UD22B 21.5" Square Display; Samsung Signage Solutions; http://www.samsung-com/us/business/commercial-display-solutions/; 2 pages; downloaded Jan. 16, 2013.
CDRinf, The Hardware Authority; Samsung Introduces LED Square Display and Transparent Display at IFA; http://www.cdrinfo.com/sections/news/Details.aspx?NewsID=34077; 2 pages; downloaded Jan. 16, 2013.

* cited by examiner

*Primary Examiner* — Phi Hoang
(74) *Attorney, Agent, or Firm* — Fitch, Even, Tabin & Flannery LLP (57) ABSTRACT

A display apparatus includes a display screen having a height and a width, a main content controller for providing a main content to the display screen for display, and a secondary content controller configured to cause a secondary content to be displayed on the display screen without obscuring any portion of the main content while the main content is displayed in the main content's original aspect ratio and across one of a full height and a full width of the display screen.

19 Claims, 6 Drawing Sheets

SYSTEM AND METHOD FOR DISPLAYING SECONDARY CONTENT ON A DISPLAY DEVICE

BACKGROUND OF THE INVENTION

1. Field of the Invention

The present invention relates generally to display devices, and more specifically to display devices for displaying video content. Even more specifically, the present invention relates to system and method for displaying secondary content on a display device.

2. Discussion of the Related Art

The 4:3 aspect ratio has been the standard aspect radio of broadcast television in the United States since at least the 1950's. In the 2000's, the 16:9 aspect ratio becomes common globally with the advent of digital and HDTV broadcast. Recorded video content for home entertainment has also typically followed one of these two aspect ratio standards. Dimensions of display devices made for the viewing of video contents, such as television sets, are generally designed to match the prevalent aspect ratio of the content they are intended to display. Therefore, before the 2000's, a typical television sets has a display screen with a 4:3 width-to-height ratio. Around the time of the filing of this application, most of the current television sets on the market have screens with a 16:9 width-to-height ratio.

SUMMARY OF THE INVENTION

In one embodiment, the invention can be characterized as a display apparatus. The display apparatus includes a display screen having a height and a width, a main content controller for providing a main content to the display screen for display, and a secondary content controller configured to cause a secondary content to be displayed on the display screen without obscuring any portion of the main content while the main content is displayed in the main content's original aspect ratio and across one of a full height and a full width of the display screen.

In another embodiment, the invention can be characterized as a method for displaying content on a display device. The method for displaying content on a display device includes the steps of displaying a main content across one of a full height or a full width of a display screen of a display apparatus, determining a free display area in the display screen not occupied by the main content, and displaying an secondary content in the free display area without obscuring any portion of a display of the main content while the main content is displayed in the main content's original aspect ratio and across one of the full height and the full width of the display screen.

In a further embodiment, the invention may be characterized as a display apparatus. The display apparatus includes a display screen, a non-transitory storage medium storing a system software, and a processor configured to execute the system software and perform the steps of displaying a main content across one of a full height or a full width of the display screen, and displaying an secondary content without obscuring any portion of a display of the main content while the main content is displayed in the main content's original aspect ratio and across one of the full height and the full width of the display screen.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
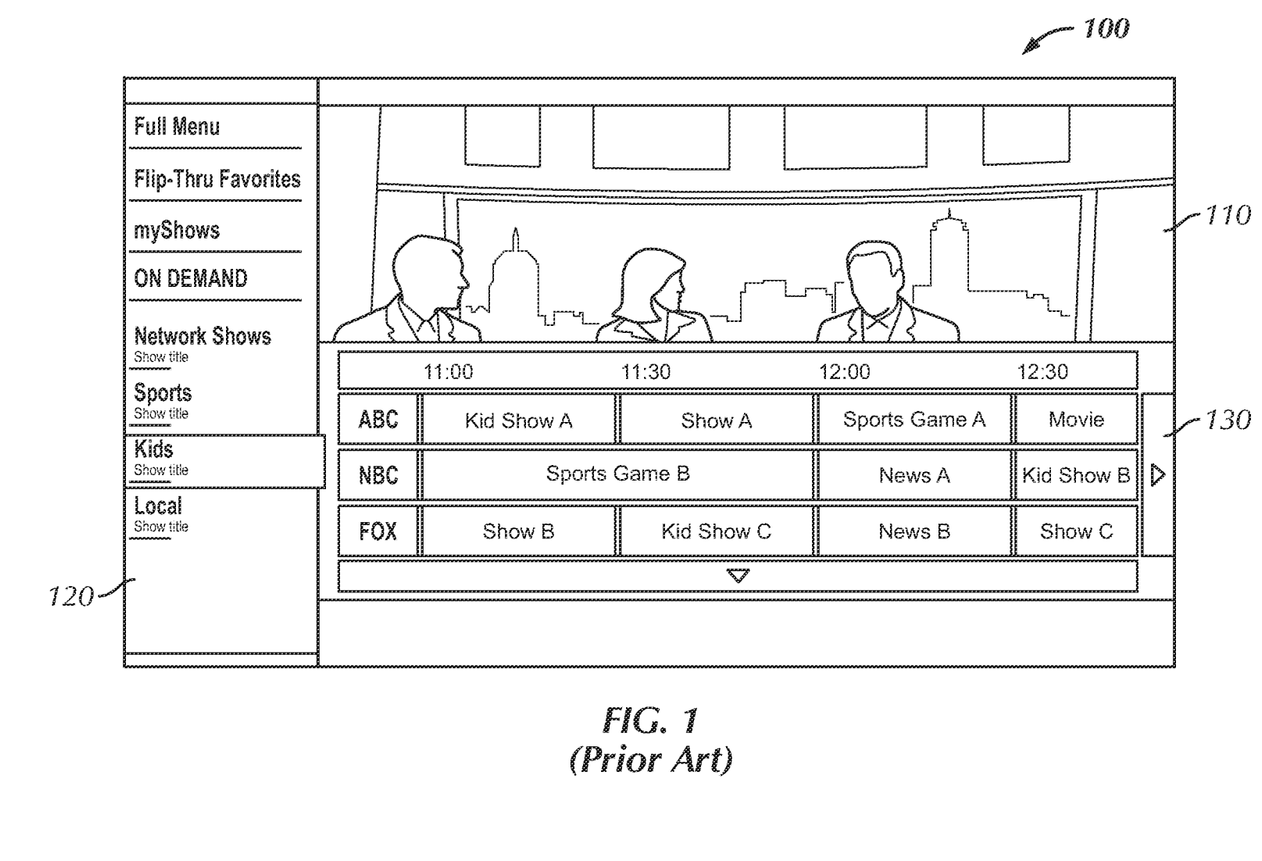
FIG. 1 is an illustration of a display screen of a prior art display device.

Referring first to FIG. 1, a display screen of a conventional display device is shown. Conventionally, a display device 100, such as a television, has a width-to-height ratio that is identical or substantially the same as the aspect ratio of the video content it is intended to display. For example, a typical present day television has the width-to-height ratio of 16:9, matching the aspect ratio of HD television broadcast signal and most DVD, Blu-Ray, internet streaming video content. As such, when the video content 110 is displayed on the display device 100, the video content occupies the full height and width of the screen of the display device 100. Some of the convention display devices also include on screen displays (OSD) features that can display information such as an electronic program guides (EPG) 130 and/or options menu 120 for the display device on the screen to the user. The display of the OSD such as options menu 120 and EPG 130 typically overlays the main video content 110 as shown in FIG. 1 which causes at least part of the main video content to be covered up by the OSD. Alternatively, some conventional televisions reduce the display size of the video content 110 when the OSD is displayed. With the width-to-height ratio of display device 100 matching the aspect ratio of the displayed main video content 110, the display of any OSD inevitably disrupts the viewing of the main video content 110 in some way.

Figure 2:
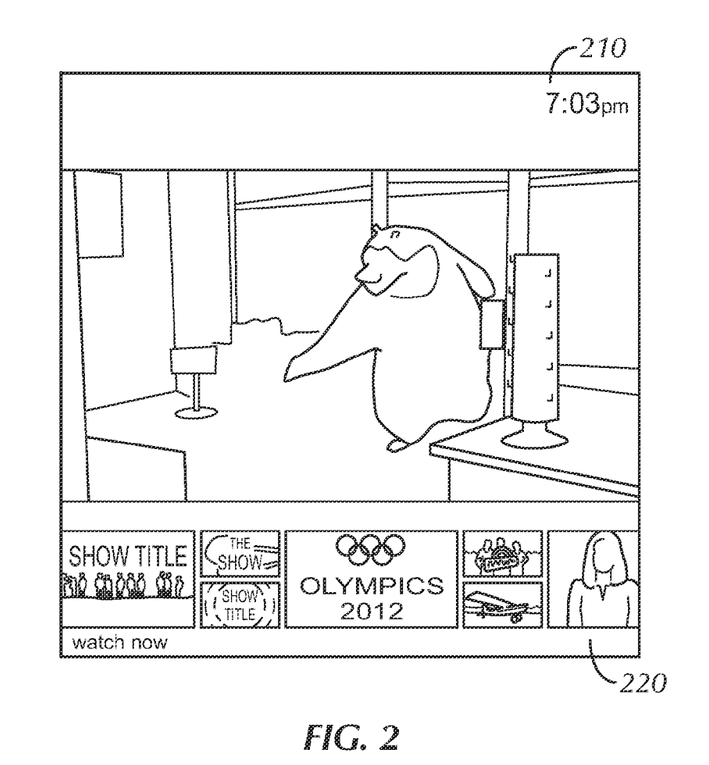
FIGS. 2-5 are illustration of display screens of a display device according to one or more embodiments of the present invention.

Referring next to FIG. 2, an example display screen of a display device according to some embodiments is shown. The display screen 200 displays a main content 210, and secondary content in two secondary content display areas 220 and 230. The display screen 200 may be part of a display device such as a HDTV, Smart TV, 3D TV, 4K Ultra HD TV, and the like. The display screen 200 may be a LCD, LED, OLED, Plasma display and the like. In FIGS. 2-5, the display screens 200-500 are shown to be square-shaped displays, having equal width and height. However, it is understood the present disclosure is not limited to a square display screen. Display screens with other width-to-height ratios may also be utilized with the systems and methods described herein.

The main content 210 may be a broadcast television program, a streaming video content, a locally generated content, or a stored video content such as video content from a DVD player, Blu-Ray player, local or remote hard drive and the like. In some embodiments, the main content 210 corresponds to a direct video input signal received by the display device from an external content source such as a television receiver, media storage, or a network connection. In some embodiments, the main content 210 may be other visual media contents such as album cover arts and photographs.

In FIG. 2, the main content 210 is displayed at the full width of the display screen 200, but does not occupy the full height of the display screen 200. The main content 210 has the aspect ratio of 16:9, while the display screen 200 has a width-to-height ratio of 1:1. The difference between the aspect ratio of the main content 210 and the width-to-height ratio of the display screen 200 creates two secondary content display areas 230 and 220 on the display screen 200. The secondary content area 220 is used to display thumb nails of other available contents. Other available contents may be programs on other channel, media content on a remote or local storage, and the like. In some embodiments, a user can interact with the secondary content displayed in the secondary content area 220. For example, a user may scroll and select one of the other available contents to change the display of the main content 210. In some embodiments, the user can select one of the other available contents to see more information relating to that available content. In some embodiments, other available contents may be displayed in different forms such as a list of titles, and/or an EPG time table.

Secondary content area 230 of FIG. 2 includes a clock. The clock in the secondary content area 230 may be part of the display device's system software or a software widget that the user can customize to provide the desired display. Other software widgets, such as ones displaying weather, stock ticker, game scores, news headlines, social media update and the like may also be installed and/or displayed in either secondary content display areas 230 or 220.

Figure 3:
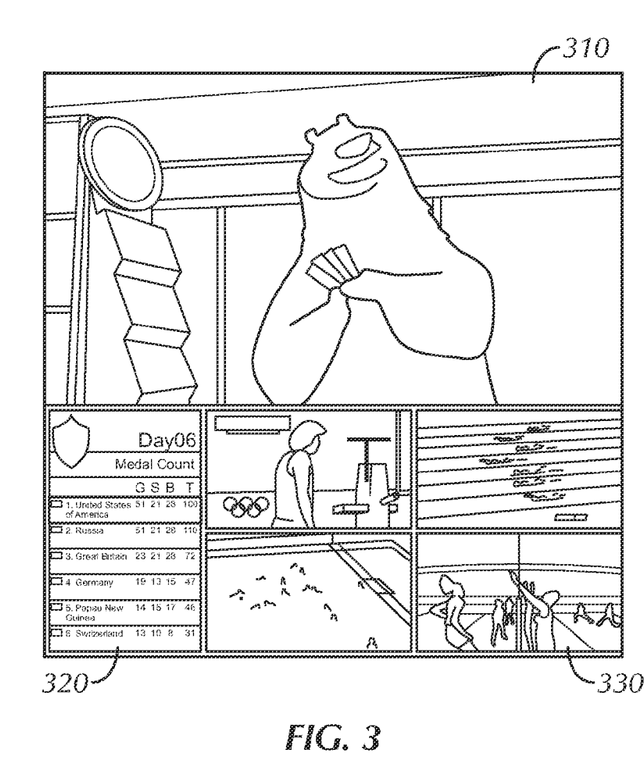

Referring next to FIG. 3, another example screen of a display device according to some embodiments is shown. In FIG. 3, the display screen 300 displays a main content 310 at the full width of the display screen. The secondary content area displays four frames 330 showing broadcasts of different sporting events and a scoreboard 320. In some embodiments, the secondary display area can display any number of frames. Each of the frames may display broadcast program from other channels, other streaming video content, and/or stored content on a local or remote storage. In some embodiments, a user may customize the content displayed in each frame. In some embodiments, a user may select one of the frames to change the display in that frame and/or of the main content 310. The score board 320 may be a software widget that retrieves information through an internet connection.

Figure 4:
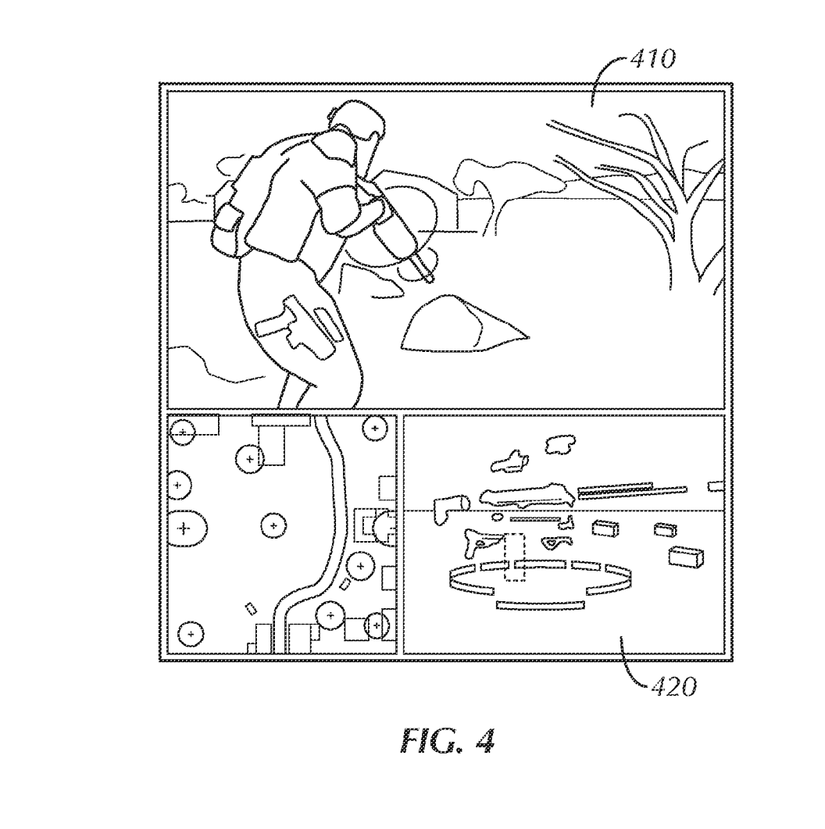

Referring next to FIG. 4, another example screen of a display device according to some embodiments is shown. In FIG. 4, the display screen 400 displays a video game-play screen as the main content 410. In the secondary content display area 420, additional information relating to the video game is shown. The additional information includes an aerial map showing the player's location and a menu for selecting weapons. Other additional game information such as options menu, in-game multiplayer messaging, player statistics, inventory, etc. may be shown in the secondary content display area. In some embodiments, the secondary content(s) may be provided by a game console providing the main content 410. In some embodiments, when the display device is connected to a game console, the game console recognizes the availability of secondary content display area, and automatically provides the additional game-play content. In some embodiments, the user can selectively enable additional game-play content on the game console. In some embodiments, the display device communicates the availability and/or dimensions of secondary content display space to the game console, and the game console provides secondary game-play content according to the available space.

Figure 5:
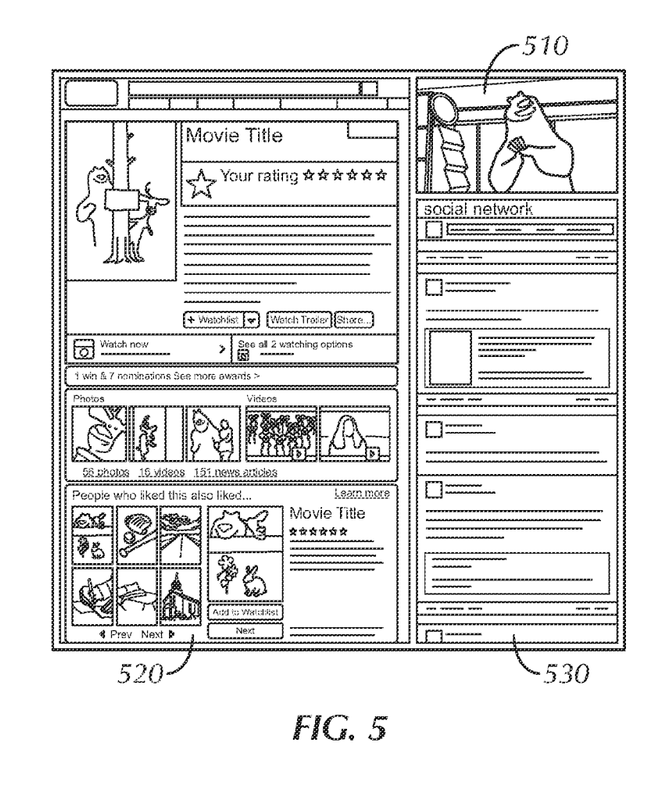

Referring next to FIG. 5, yet another example screen of a display device according to some embodiments is shown. In the display screen 500, a main video content 510 is shown, along with website content 520 and social media content 530. FIG. 5 illustrates that, in some embodiments, the user can customize the size of the main video content and secondary contents. The square aspect ratio of the display screen 500 makes the screen particularly adapted for reading texts on a website or in a document.

Alternatively, in some embodiments, the website content 520 may be considered the main content occupying the full height of the screen. The main video content 510 and social media content 530 may be considered secondary content. That is, in FIG. 5, the main content occupies the full height but not the full width of the screen. As shown in FIG. 5, a secondary content display area may also be to the left or right of the main content display.

Figure 6:
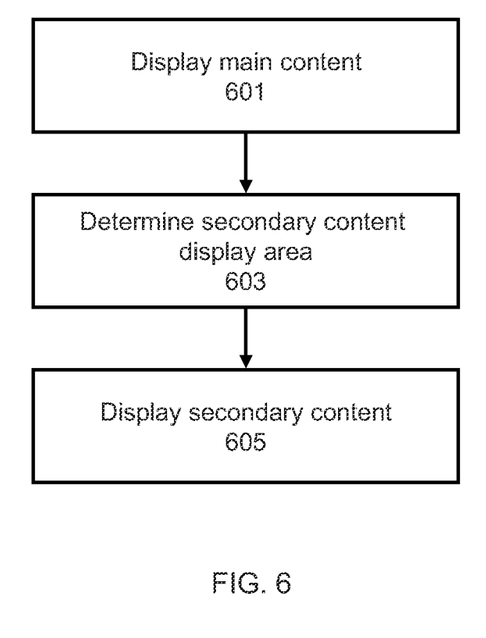
FIG. 6 shows a flowchart of a process for displaying secondary content according to one or more embodiments of the present invention.

Referring next to FIG. 6, a method for displaying secondary content on a display device in shown. In step 601, a main content is displayed. The main content may be at least one of broadcast television content, streamed video content, local video content, recorded video content, and video game play content. In some embodiments, the main content corresponds to an input video signal received from an external source, for example, a television receiver, cable box, set-top box, satellite dish, DVD player, Blu-Ray player, game console, internet streaming sources, local media storage, remote media storage, etc. In some embodiments, in step 601, the main content is automatically displayed at its largest size while maintaining its aspect ratio and without cropping any portion of the main content. Due to the difference between the aspect ratio of the main content and the width-to-height ratio of the display device, the largest display size may occupy the full width or the full height of the screen, but not both. For example, when a square display device receives a standard HDTV signal having a 16:9 aspect ratio, the HDTV content would be displayed at the full width of the square display screen and would only occupy nine-sixteenth of the height of the square display screen.

In step 603, the display device determines the size and/or dimension of the secondary display area. The secondary content display area may be one or more area not occupied by the main content. In some embodiments, step 603 includes a determination of the availability of secondary content display area. In some embodiments, step 603 includes a determination of the dimensions the secondary content display area or areas by comparing the aspect ratio of the main content and the dimensions of the display screen. For example, when a square display device receives a standard 16:9 aspect ratio video as the main content, the secondary content display area may be determined to have the width of the square display screen, and seven-sixteenth of the height of the display screen. In some embodiments, the secondary content display area can be split into two or more areas, such as previously shown in FIG. 2. In some embodiments, the determination of secondary content display area may be based on the source and/or type of the input video signal. In some embodiments, the device may assume all incoming video signals has a standard aspect ratio, and assumes the secondary content display area based on the ratio differences between the width-to-height ratio of the display screen and the standard aspect ratio.

In step 605, the display device displays secondary content. The secondary content may include one or more of options menu, thumbnail video content, stock ticker, sports ticker, advertisement, auxiliary device controls, video game play data, electronic program guide, web content, software widget, and supplemental content corresponding to the main video content. In some embodiments, the display of secondary content is restricted to the previously determined available secondary content display area. As such, the secondary content is displayed without obscuring any portion of the display of the main content while the main content is displayed in the main content's original aspect ratio and across one of the full height and the full width of the display screen. That is, the secondary content utilizes the screen space not occupied by the main content when the main content is displayed at the maximum size, and therefore, the display of the secondary content does not obscure or affect the display of the main content.

In some embodiments, the display of the secondary content changes the display position of the main content. For example, for a main content that is displayed at the full width of the display screen, the main content's display position may be shifted up or down to reallocate space available to the secondary content display areas below and above the main content. The display position of the main content as well as the content displayed in the secondary content display areas may be fully customizable by a user. In some embodiments, users can further interact with the secondary content in various ways. For example, a user may browse through an electronic program guide displayed in the secondary content display area and select a desired program to be displayed as the main content. A user may also use the secondary content area to access web pages and social media services. In some embodiments, the secondary content area may have a default display, in which advertisements and/or supplemental content related to the main content are displayed when the user is not actively utilizing the secondary content display area. The default content may be determined and/or supplied by a remote advertisement or supplemental content server. In some embodiments, a user can selectively disable the display of secondary content.

Figure 7:
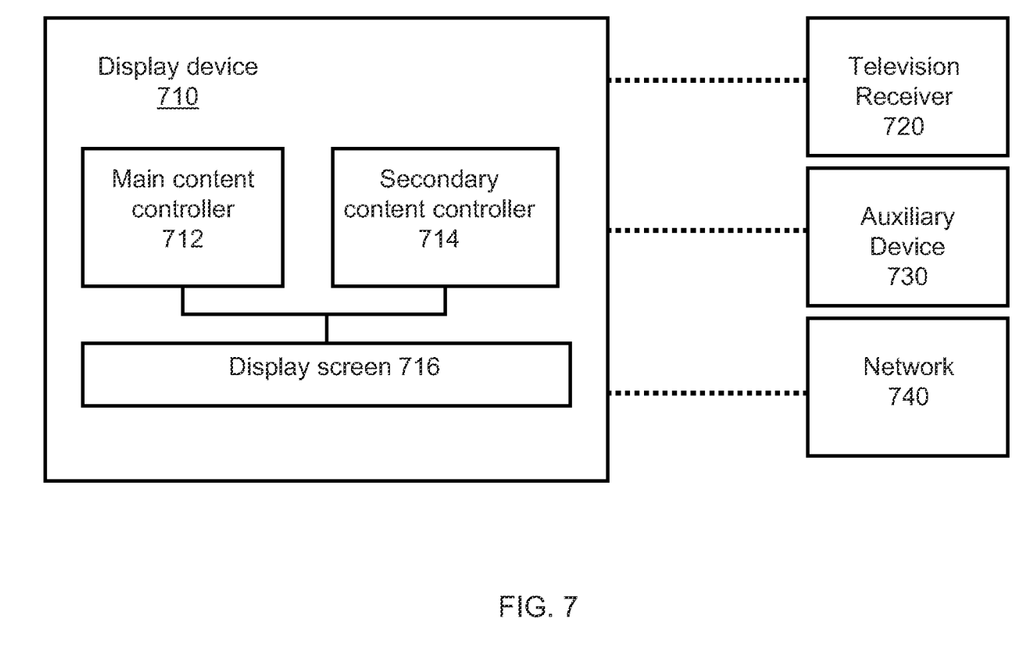
FIG. 7 shows a simplified block diagram of a display system according one or more embodiments of the present invention.

Referring next to FIG. 7, a system for providing secondary content display on a display device is shown. The system includes a display device 710 having a display screen 716, a main content controller 712, and a secondary content controller 714. The display device may be connected, locally or remotely, to one or more of television receiver 720, auxiliary device 730, and network 740.

The display device 710 may be a television set such as a Smart TV, HDTV, 3D TV, 4K Ultra HD TV, etc. The display screen 716 may be a LCD, LED, OLED, Plasma display and the like.

The display screen 716 has a different width-to-height ratio than the broadcast television standard aspect ratio or ratios, which at the time of this application, is one of 4:3 and 16:9. In some embodiments, the display screen 716 has a 1:1 width-to-height ratio, that is, the display screen may be a square display. Other display screen dimensions are also possible without departing from the spirit of the present disclosure.

The main content controller 712 may be a hardware or software module. In some embodiments, main content controller 712 may represent a set of computer readable instructions stored on a storage medium and executed by a processor. The main content controller 712 controls the display of a main content on the display screen 716. The main content may correspond to data signal received from an external source, such as television receiver, cable box, set-top box, satellite dish, DVD player, Blu-Ray player, game console, internet streaming source, local media storage, remote media storage etc. The main content controller 712 may determine the largest or maximum display size for the received video content. The maximum display size may occupy either the full width or full height of the display screen 716 without any portion of the video being outside the frame of the display screen 716. In some embodiments, the main content controller 712 may reposition and/or rescale the display of the main content based instructions received from the secondary content controller 714. In some embodiments, a user may define a portion of the display screen area that is available to the main content, and the maximum display size is determine according to the size of the user defined portion of the display screen instead of the entire display screen.

The secondary content controller 714 controls the display of secondary content. In some embodiments, secondary content controller 714 may represent a set of computer readable instructions stored on a storage medium and executed by a processor. The secondary content can be any on-screen display that is not the main content. In some embodiments, the secondary content controller 714 determines whether any secondary content display area is available. The secondary content controller 714 may compare the aspect ratio of the main content and the width-to-height ratio of the display screen 716 to determine whether any secondary content display area is available. In some embodiments, the secondary content controller 714 determines the available size of one or more secondary content display area and configures the display of secondary content according to the size of the available area or areas.

In some embodiments, the secondary content controller causes the display screen 716 to display secondary content according to user configurations. For example, a user may select one or more of several different types of secondary content to display, including, but not limited to: options menu, thumbnail video content, stock ticker, sports ticker, advertisement, auxiliary device controls, video game play data, electronic program guide, web content, software widget, and supplemental content corresponding to the main video content. In some embodiments, the content displayed in the secondary content display area is fully customizable.

In some embodiments, the secondary content controller may select the displayed secondary content base on the main content and/or a state of the display device 710. For example, the secondary content controller 714 may display on-screen controls for an auxiliary device when the display device 710 is initially tuned to the input of from the corresponding auxiliary device. In another example, the secondary content controller may automatically display sports stickers when the main content is tuned to a sports program or channel. In some embodiments, the secondary content controller causes advertisements to be displayed when the user is not actively utilizing other types of secondary content. In some embodiments, the secondary content controller causes supplemental information relating to the displayed main content to be displayed.

While in FIG. 7, main content controller 712 and secondary content controller 714 are represented by separate blocks, the functionalities of the two controllers may be implemented in one or more shared physical component. In some embodiments, the main content controller 712 and the secondary content controller 714 may be implemented with multiple components. In some embodiments, the main content controller 712 and secondary content controller 714 are software modules of the system software, software framework, application programming interface (API), middleware, and/or an operating system of the display device. In some embodiments, the controllers are software modules of a proprietary smart TV platform and/or system software interface. While FIG. 7 shows that outputs of the main content controller 712 and the secondary content controller 714 are directly received by the display screen 716, it is understood that there may be one or more intermediate module that combines the information from the two controllers to provide a single display signal to the display screen 716. The main content controller 712 and secondary content controller 714 may also directly communicate with each other. It is also understood that the display device 710 may include a number of other hardware and/or software modules that are not shown.

The display device 710 may be connected, through wired or wireless connection to one or more of television receiver 720, auxiliary device 730, and network 740, collectively referred to as external devices. The television receiver 720 may receive a broadcast television signal from a broadcast station through over-the-air broadcast, cable service, or satellite signals etc. The auxiliary device 730 may be a DVD player, a Blu-Ray player, a local media storage, a networked media storage, a game console, a set-top box, and the like. The display device 710 may be connected to the network 740 through a built-in network adapter or through one of the auxiliary devices 730. The network 740 may be the Internet, a local network, a private network, a home network, a regional network, etc.

In some embodiments, both the main content controller 712 and the secondary content controller 714 may cause the display screen 716 to display images corresponding a signal or data received from one of the external devices. For example, the main content controller 712 can cause the display screen to display one of television program received from the television receiver 720, a Blu-Ray movie received from a Blu-Ray device, or a streaming video received from the network 740. The secondary content controller 714 can include inputs or data from one or more of the external devices in the display of the secondary content. For example, the secondary content controller 714 can incorporates one or more of the following into the display of the secondary content: thumbnails of programs on other channels, EPG etc. from television receiver 720; on-screen auxiliary device controls, images corresponding to available content on a media player and/or storage, extra game play data, etc. from one or more auxiliary device 730; stock ticker, game score ticker, web content, web streaming video, advertisements, weather information, etc. from the network 740.

In some embodiments, the display device further includes a communication module (not shown) that communicates with an auxiliary device. The communication module may transmit information relating to the availability and the dimensions of the secondary content display area. In some embodiments, an auxiliary device may provide data to the display device 710 according to the received information relating to the secondary content display area. For example, the auxiliary device 730 may be a game console. The game console may normally only provide a game-play video signal in the 16:9 aspect ratio to a display device. When the game console is connected to the display device 710, it may recognize that the display device has available secondary content display area and provide additional game play data to be displayed in the secondary content display area.

Figure 8:
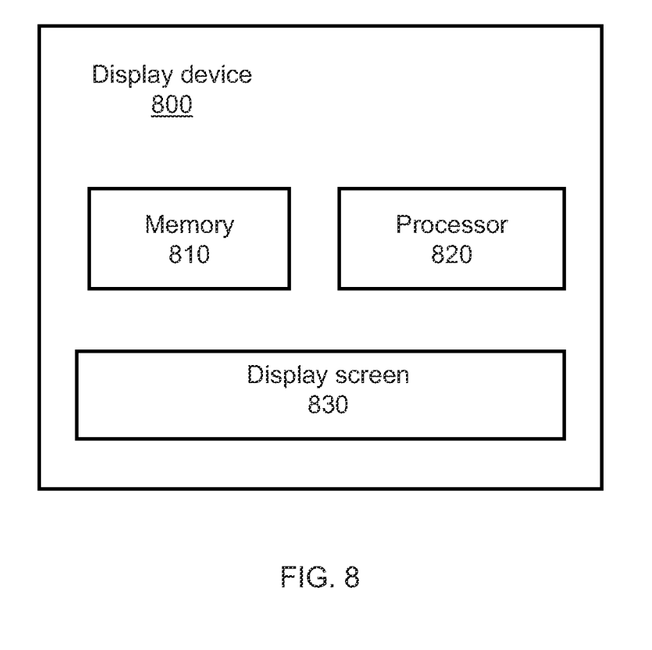
FIG. 8 shows a simplified block diagram of a display system according to one or more embodiments of the present invention.

Referring next to FIG. 8, a system for providing secondary content display on a display device is shown. In FIG. 8, the display device includes a memory 810, a processor 820, and a display screen 830. The display device 800 may be a television set such as a Smart TV, HDTV, 3D TV, 4K Ultra HD TV, etc. The display screen 830 may be a LCD, LED, OLED, Plasma display and the like. In some embodiments, the display screen is a square display.

In some embodiments, the processes discussed with reference to FIGS. 2-7 may be a set of executable code stored in the memory 810. The executable code may be shipped with the display device 800 when the display device 800 is sold. The executable code may also be updated through an internet or other types of network connection. The processor 820 may be configures to execute the codes stored in memory 810 to cause the display of main content and/or secondary content as previously discussed on the display screen 830.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A display apparatus comprising:
   a display screen having a height and a width;
   a main content controller for providing a main content to the display screen for display;
   a secondary content controller configured to cause a secondary content to be displayed on the display screen without obscuring any portion of the main content while the main content is displayed in the main content's original aspect ratio and across one of a full height and a full width of the display screen; and
   wherein the display apparatus is configured to determine that a portion the display screen is not occupied by the main content based on the aspect ratio of the main content and transmit a signal to an auxiliary device to indicate that an area on the display screen is not occupied by the main content and available for displaying the secondary content; and
   wherein the secondary content is determined and provided by the auxiliary device in response to receiving the signal that indicates the area on the display screen is not occupied by the main content and available for displaying the secondary content.

2. The display apparatus of claim 1, wherein a width-to-height ratio of the display screen is different from an aspect ratio of an input video signal.

3. The display apparatus of claim 1, wherein the height and the width of the display screen are equal.

4. The display apparatus of claim 1, wherein the display apparatus further comprises
   a television receiver, and
   a non-transitory storage medium storing a system software of the display apparatus.

5. The display apparatus of claim 1, wherein a display of secondary content does not affect a display size of the main content.

6. The display apparatus of claim 1, wherein a display position of the main content is adjusted in response to the display of the secondary content.

7. The display apparatus of claim 1, wherein the main content comprises at least one of broadcast television content, streaming video content, local video content, recorded video content, and video game play content.

8. The display apparatus of claim 1, wherein the secondary content comprises at one or more of options menu, thumbnail video content, stock ticker, sports ticker, advertisement, auxiliary device controls, video game play data, electronic program guide, web content, software widget, and supplemental content corresponding to the main content.

9. The display apparatus of claim 1, wherein the secondary content controller causes the displaying of the secondary content based at least in part on a dimension of an area on the display screen not occupied by the main content.

10. The display apparatus of claim 1, wherein the auxiliary device comprises a device external to the display apparatus.

11. A method for displaying content on a display device comprising:
    displaying a main content across one of a full height or a full width of a display screen of a display apparatus;
    determining a free display area in the display screen not occupied by the main content; and
    displaying a secondary content in the free display area without obscuring any portion of a display of the main content while the main content is displayed in the main content's original aspect ratio and across one of the full height and the full width of the display screen;
    determining that a portion the display screen is not occupied by the main content based on the aspect ratio of the main content; and
    transmitting a signal to an auxiliary device to indicate that an area on the display screen is available for displaying the secondary content;
    wherein the secondary content is determined and provided by the auxiliary device in response to receiving the signal that indicates the area on the display screen is not occupied by the main content and available for displaying the secondary content.

12. The method of claim 11, wherein a width-to-height ratio of the display screen is different from an aspect ratio of an input video signal.

13. The method of claim 11, wherein a height and a width of the display screen are equal.

14. The method of claim 11, wherein the display screen is a screen of a television running a system software of the display apparatus.

15. The method of claim 11, wherein a display of secondary content does not affect a display size of the main content.

16. The method of claim 11, wherein a display position of the main content is adjusted in response to the display of the secondary content.

17. The method of claim 11, wherein the main content comprises at least one of broadcast television content, streaming video content, local video content, recorded video content, and video game play content.

18. The method of claim 11, wherein the secondary content comprises one or more of options menu, thumbnail video content, stock ticker, sports ticker, advertisement, auxiliary device controls, video game play data, electronic program guide, web content, software widget, and supplemental content corresponding to the main content.

19. A display apparatus comprising:
    a display screen;
    a non-transitory storage medium storing a system software;
    a video receiver for receiving a main content; and a processor configured to execute the system software and perform the steps of:
- displaying the main content across one of a full height or a full width of the display screen;
- determining that a portion the display screen is not occupied by the main content based on the aspect ratio of the main content;
- transmitting a signal to an auxiliary device to indicate that an area on the display screen is not occupied by the main content and is available for displaying the secondary content; and
- displaying the secondary content without obscuring any portion of a display of the main content while the main content is displayed in the main content's original aspect ratio and across one of the full height and the full width of the display screen;
- wherein the secondary content is determined and provided by the auxiliary device in response to receiving the signal that indicates the area on the display screen is not occupied by the main content and available for displaying the secondary content.

\* \* \* \* \*

UNITED STATES PATENT AND TRADEMARK OFFICE
CERTIFICATE OF CORRECTION

PATENT NO. : 9,510,039 B2  
APPLICATION NO. : 13/784614  
DATED : November 29, 2016  
INVENTOR(S) : Young Page 1 of 1

It is certified that error appears in the above-identified patent and that said Letters Patent is hereby corrected as shown below:

On the Title Page  
First page, Column 2, OTHER PUBLICATIONS, Line 1, delete "FRST" and insert --FIRST--.  
First page, Column 2, OTHER PUBLICATIONS, Line 11, delete "CDRinf," and insert --CDRinfo--.  
In the Claims  
Claim 1, Column 9, Line 39, after "portion" insert --of--.  
Claim 8, Column 10, Line 4, after "comprises" delete "at".  
Claim 11, Column 10, Line 28, after "portion" insert --of--.  
Claim 19, Column 11, Line 5, after "portion" insert --of--.

Signed and Sealed this  
Eighteenth Day of April, 2017

Michelle K. Lee  
*Director of the United States Patent and Trademark Office*